United States Patent
Haskell et al.

(10) Patent No.: US 7,738,555 B2
(45) Date of Patent: Jun. 15, 2010

(54) SYSTEM, METHOD AND COMPUTER-READABLE MEDIUM FOR ENCODING A SIGNAL INTO MACROBLOCKS

(75) Inventors: Barin Geoffry Haskell, Tinton Falls, NJ (US); Atul Puri, Riverdale, NY (US); Robert Lewis Schmidt, Howell, NJ (US)

(73) Assignee: AT&T Intellectual Property II, L.P., New York, NY (US)

( * ) Notice: Subject to any disclaimer, the term of this patent is extended or adjusted under 35 U.S.C. 154(b) by 1188 days.

(21) Appl. No.: 11/170,622

(22) Filed: Jun. 29, 2005

(65) Prior Publication Data

US 2006/0002467 A1     Jan. 5, 2006

Related U.S. Application Data

(63) Continuation of application No. 10/664,985, filed on Sep. 18, 2003, now Pat. No. 7,269,219, which is a continuation of application No. 09/974,788, filed on Oct. 12, 2001, now Pat. No. 6,654,418, which is a continuation of application No. 08/899,096, filed on Jul. 24, 1997, now Pat. No. 6,347,116.

(60) Provisional application No. 60/038,016, filed on Feb. 14, 1997.

(51) Int. Cl.
*H04N 7/18* (2006.01)
(52) U.S. Cl. ............. 375/240.03; 375/240.04; 375/240.05
(58) Field of Classification Search .................. 375/240.01–240.09, 240.23
See application file for complete search history.

(56) References Cited

U.S. PATENT DOCUMENTS

| 4,920,414 | A |   | 4/1990  | Remus et al. ............ 358/133 |
| 5,170,264 | A |   | 12/1992 | Saito et al. ............. 358/433 |
| 5,294,974 | A | * | 3/1994  | Naimpally et al. ........ 348/405 |
| 5,426,512 | A |   | 6/1995  | Watson |
| 5,434,623 | A | * | 7/1995  | Coleman et al. .......... 348/405 |
| 5,473,377 | A | * | 12/1995 | Kim ...................... 348/405 |
| 5,493,513 | A |   | 2/1996  | Keith et al. ........... 364/514 R |
| 5,524,024 | A |   | 6/1996  | Lin |
| 5,543,844 | A | * | 8/1996  | Mita et al. ............. 348/405 |

(Continued)

FOREIGN PATENT DOCUMENTS

EP        0540961        10/1982

(Continued)

OTHER PUBLICATIONS

"Quantizing Characteristics Based on Initial Compatability Check Parameters," CCITT SG XV, Doc. 285, Specialist Group on Coding for Visual Telephony, Jan. 1988.

(Continued)

*Primary Examiner*—Andy S Rao

(57) ABSTRACT

A quantizer and dequantizer for use in a video coding system that applies non linear, piece-wise linear scaling functions to video information signals based on a value of a variable quantization parameter. The quantizer and dequantizer apply different non linear, piece-wise linear scaling functions to a DC luminance signal, a DC chrominance signal and an AC chrominance signal. A code for reporting updates of the value of the quantization parameter is interpreted to require larger changes when the quantization parameter initially is large and smaller changes when the quantization parameter initially is small.

77 Claims, 2 Drawing Sheets

U.S. PATENT DOCUMENTS

| | | | |
|---|---|---|---|
| 5,559,557 A | | 9/1996 | Kato |
| 5,570,203 A | * | 10/1996 | Suzuki et al. ................ 348/405 |
| 5,604,540 A | * | 2/1997 | Howe .......................... 348/405 |
| 5,612,900 A | | 3/1997 | Azadegan et al. |
| 5,659,362 A | * | 8/1997 | Kovac et al. ................ 348/384 |
| 5,822,462 A | * | 10/1998 | Miyake ....................... 348/405 |
| 5,835,149 A | | 11/1998 | Astle |
| 5,870,144 A | * | 2/1999 | Guerrera ..................... 348/403 |
| 5,929,916 A | * | 7/1999 | Legall et al. ........... 375/240.05 |
| 5,937,098 A | * | 8/1999 | Abe ............................ 382/239 |
| 5,974,184 A | | 10/1999 | Eifrig et al. |
| 6,219,043 B1 | * | 4/2001 | Yogeshwar et al. ........... 341/55 |
| 6,219,457 B1 | | 4/2001 | Potu |
| 2004/0028143 A1 | | 2/2004 | Schoenblum |

FOREIGN PATENT DOCUMENTS

| | | |
|---|---|---|
| EP | 0400756 | 5/1990 |
| EP | 0 400 756 A2 | 12/1990 |
| EP | 0 514 663 A2 | 11/1992 |
| EP | 0 517 256 A2 | 12/1992 |
| EP | 0 566 219 A2 | 10/1993 |
| EP | 0 582 819 A2 | 2/1994 |

OTHER PUBLICATIONS

International Organization for Standardization: Coded Representation of Picture and Audio Information, "Modified singalling of changed quantizer stepsize," ISO-IEC/JTC1/SG2/WG8, MPEG 90-126, Jul. 1990.

"Report of the Sixteenth Meeting in Stuttgart," Specialists Group on Coding for Visual Telephony, CCITT SGXV, Working Party XV/1, 89/540, Jun. 16, 1989.

International Organization for Standardization: Coded Representation of Picture and Audio Information, "Framework for Improving Quantization Options," ISO-IEC/JTC1/SC29/WG11, MPEG 92/357, Angra dos Reis, Jul. 1992.

International Organization for Standardization: Coded Representation of Picture and Audio Information, "Recommendations resulting from ad-hoc group meeting," ISO-IEC/JTC1/SC29/WG11, MPEG 92/542, Sep. 1992.

* cited by examiner

SYSTEM, METHOD AND COMPUTER-READABLE MEDIUM FOR ENCODING A SIGNAL INTO MACROBLOCKS

RELATED APPLICATION

This application is a continuation of application Ser. No. 10/664,985, filed Sep. 18, 2003, now U.S. Pat. No. 7,269,219 which is a continuation of application Ser. No. 09/974,788, filed on Oct. 12, 2001 and issued as U.S. Pat. No. 6,654,418, which is a continuation of application Ser. No. 08/899,096, filed on Jul. 24, 1997 now U.S. Pat. No. 6,347,116 which claims the benefit of priority afforded by provisional application No. 60/038,016, filed Feb. 14, 1997, the disclosure of each of these applications is incorporated herein by reference.

BACKGROUND OF THE INVENTION

The present invention related to a quantizer for use in image coding.

It is known to scale discrete cosine transformation coefficients in video coding applications to conserve bandwidth. Known systems either scale by a small constant, such as divide by 8, or scale by a linear scaling factor that is twice a quantization parameter ($2 \times Q_p$). Scaling by the small constant does not achieve significant bandwidth savings. Scaling by the $2*Q_p$ linear scaling function achieves significant bit savings, but results in poor image quality at lower and mid-level $Q_p$ values particularly in the chrominance video signals. Accordingly, there is a need in the art for a quantizer characterized by a scaling function that achieves good signal quality, and achieves bit rate savings for all values of $Q_p$ particularly for chrominance.

An encoder and decoder must use the same quantization parameter to encode and decode video information intelligibly. Known systems report changes to the quantization parameter with codes that cause changes in $Q_p$ with a uniform step size, regardless of the value of $Q_p$.

Experience teaches that, at low values of $Q_p$, changes in $Q_p$ are relatively small. However, for large values of $Q_p$, changes in $Q_p$ values are relatively large. Systems that allocate additional bits to report the larger $Q_p$ changes waste bandwidth at the lower $Q_p$ values where the large changes do not occur. However, systems that limit the number of bits available to coding $Q_p$ changes may become saturated if larger changes must be coded. Accordingly, there is a need in the art for a quantizer that reports both large and small changes in $Q_p$ with a minimum number of bits.

SUMMARY OF THE INVENTION

The disadvantages of the art are alleviated to a great extent by a quantizer that applies a non-linear scaling function based on the quantization parameter. A different scaling function applies for luminance data than chrominance data. Both scaling functions at low $Q_p$ values approximate constant scaling functions. At large $Q_p$ values, the luminance scaling function approximates a $2*Q_p$ scaling function and the chrominance scaling function approximates a $1*Q_p$ scaling function. The quantizer may include a non-linear scaling function for AC coefficients.

The present invention may include a way to update values of $Q_p$. Changes in $Q_p$ are reported in a fixed length code, but each code means different things based on the previous values of $Q_p$. If the previous $Q_p$ value is large, the code represents a larger change than if the previous value of $Q_p$ were small.

DETAILED DESCRIPTION

Figure 1A:
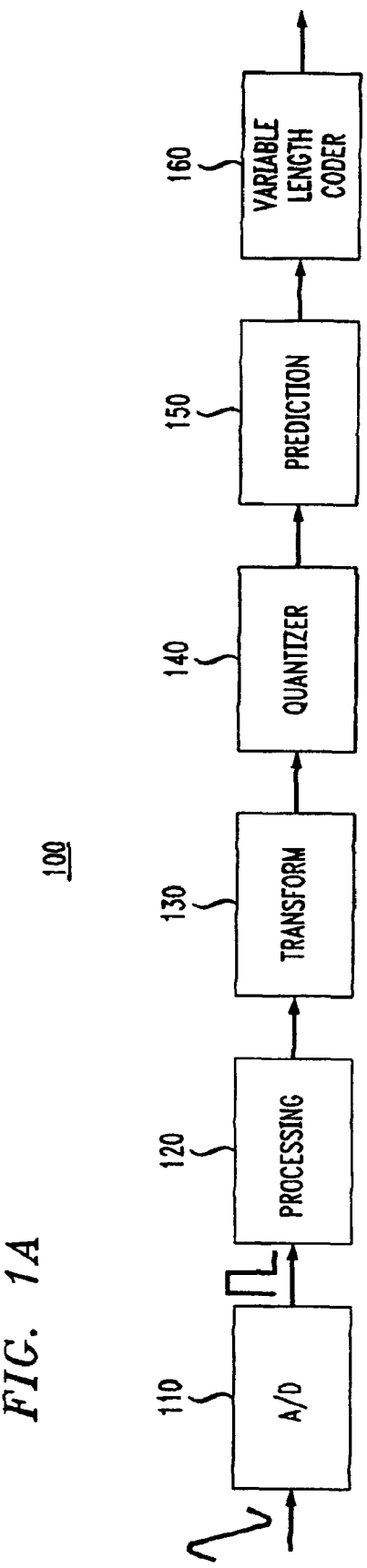
FIG. 1(a) is a block diagram of a first embodiment of an encoder 100 of the present invention.
Figure 1B:
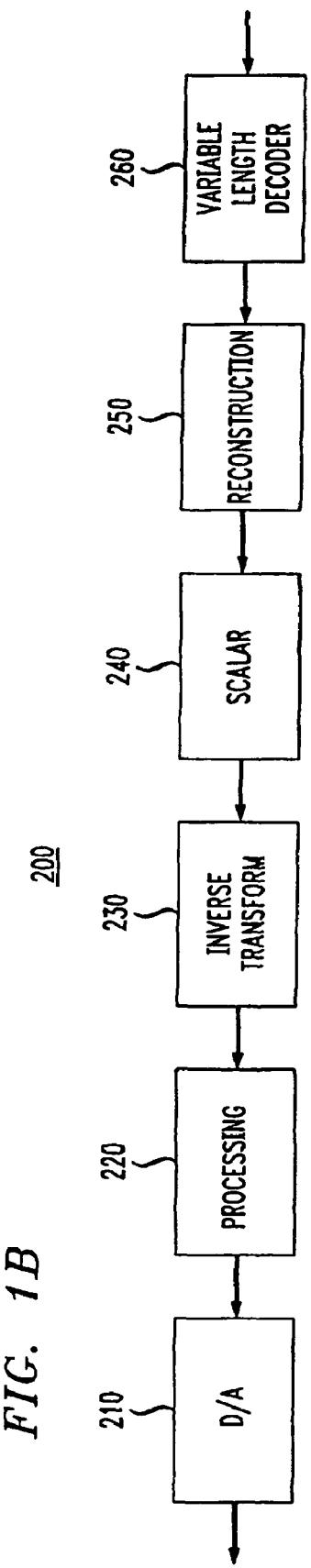
FIG. 1(b) is a block diagram of a first embodiment of a decoder 200 of the present invention.

FIG. 1 shows an encoder 100 constructed in accordance with a first embodiment of the present invention. An analog image signal is presented to the encoder 100. The image signal is sampled and converted to a digital signal by an analog to digital ("A/D") converter 110 using techniques known in the art. The A/D converter 110 generates a digital image signal for a plurality of pixels of the image. Alternatively, the image signal may be presented to the encoder 100 as a digital image signal; in this case, the A/D converter 110 is omitted.

The digital image signal is input to a processing circuit 120. The processing circuit 120 may perform a host of functions. Typically, the processing circuit 120 filters the image data and breaks the image data into a luminance signal component and two chrominance signal components. Additionally, the processing circuit 120 groups image data into blocks of data. Where the digital input signal represents information for a plurality of pixels in a scanning direction, the digital output of the processing circuit 120 represents a block of pixels, for example an 8 pixel by 8 pixel array of image data. The processing circuit 120 outputs image data on a macro block basis. A macro block typically consists of blocks of luminance data and blocks of chrominance data, for example, up to four blocks of luminance data and up to two blocks of chrominance data. The processing circuit 120 may also perform additional functions, such as filtering, to suit individual design criteria.

The output of the processing circuit 120 is input to a transform circuit 130. The transform circuit 130 performs a transformation of the image data, such as discrete cosine transform ("DCT") coding, from the pixel domain to a domain of coefficients. A block of 64 pixels is transformed to a block of 64 coefficients. Coefficients output by DCT coding include a single DC coefficient and 63 AC coefficients, few of which are non-zero. The transform circuit 130 outputs blocks of coefficients organized into macro blocks.

A quantizer 140 scales the DC and AC coefficients generated by the prediction circuit 150 according to a non-linear scaling function governed by a variable quantization parameter ($Q_p$). The quantization parameter is a value determined by the bit rate of the channel, the resolution of the image being coded, the type of image coding (intra or inter) and other factors that affect a number of bits that may be allocated to coding of the macro block. $Q_p$ is updated on a macro block by macro block basis; changes in $Q_p$ are reported in an output bitstream. In MPEG coding, $Q_p$ takes on values between 1 and 31. The quantizer 140 reduces bandwidth of the image signal by reducing a number of quantization levels available to encoding the signals. Many small coefficients input to the quantizer 140 are divided down and truncated to zero. The scaled signals are output from the quantizer 140.

The output of the quantizer 140 is input to a prediction circuit 150. The prediction circuit 150 performs gradient prediction analysis to predict the DC coefficient of the block. The prediction circuit 150 may pass the AC coefficients generated by the transform circuit 130 or, alternatively, may predict AC coefficients of the block. In a preferred mode of operation, the prediction circuit 150 selects between modes of predicting or passing AC coefficients; in this case, the prediction circuit 150 generates an AC prediction flag to identify a mode of operation. The prediction circuit 150 outputs DC coefficient signals and AC coefficient signals (representing either AC coefficients or AC residuals) on a macro block basis and, on a macro block basis optionally, an AC prediction flag.

A variable length coder 160 encodes the output of the quantizer 140. The variable length coder 160 typically is a Huffman encoder that performs run length coding on the scaled signals. A bitstream output from the variable length coder 160 may be transmitted, stored, or put to other uses as are known in the art.

A decoder 200 performs operations that undo the encoding operation described above. A variable length decoder 260 analyzes the bitstream using a complementary process to recover a scaled signal. If a Huffman encoder were used by the encoder 160, a Huffman decoder 260 is used.

A reconstruction circuit 250 performs the identical gradient analysis performed in the prediction circuit 150. The DC residual signal is identified and added to a predicted coefficient to obtain a DC coefficient. Optionally, the reconstruction circuit 250 may identify the AC prediction flag and, based on the status of that flag, interprets the AC information as either AC coefficient information or AC residual information. In the event that AC residual information is present, the reconstruction circuit 250 adds the residual signals to corresponding predicted signals to obtain AC coefficients. The reconstruction circuit 250 outputs coefficient signals.

A dequantization circuit 240 multiplies the recovered signals by the same scalar values used at the quantizer 140. Of course, those coefficients divided down to zero are not recovered.

An inverse transformation circuit 230 performs the inverse transformation applied by the transform circuit 130 of encoder 100. If DCT transformation were performed, an inverse DCT transformation is applied. So, too, with sub-band coding. The inverse transformation circuit 230 transforms the coefficient information back to the pixel domain.

A processing circuit 220 combines luminance and chrominance signals and may perform such optional features as are desired in particular application. The processing circuit 220 outputs digital signals of pixels ready to be displayed. At this point the signals are fit for display on a digital monitor. If necessary to fit a particular application, the signals may be converted by a digital to analog converter 210 for display on an analog display.

The present invention achieves bit rate savings by applying a non-linear scaler function at the quantizer 140 to obtain bit rate savings at high $Q_p$ levels but ensure high video quality at low $Q_p$ levels. The quantizer 140 applies different scalar functions depending upon the type of data being quantized (luminance or chrominance), the type of coefficient being quantized (DC or AC) and the type of coding (inter or intra) being performed.

Non-Linear Quantization of DC Coefficients for Luminance and Chrominance

For DC coefficient information, the scalar functions vary with $Q_p$. Different piece-wise linear scalar functions are applied to DC luminance and DC chrominance signals. To minimize objectionable artifacts within the chrominance signal, the DC chrominance scalar is smaller than the DC luminance scalar for all $Q_p$ values.

The DC luminance scalar function for low $Q_p$ values is a constant. For large $Q_p$ levels, the DC luminance scalar function approximates a $2*Q_p$ function. The inventors obtained through experimentation the DC scalar function shown in Table 1 below, used in an embodiment of the invention.

The DC chrominance scalar function is also at a constant at low values $Q_p$. At high $Q_p$ values, the DC chrominance scalar function approximates a linear scalar function in $Q_p$. The inventors obtained through experimentation the DC scalar function for chrominance signals shown in Table 1 below, used in a preferred embodiment.

TABLE 1

| Component | DC Scalar for Quantizer ($Q_p$) Range | | | |
|---|---|---|---|---|
| | 1 through 4 | 5 through 8 | 9 through 24 | 25 through 31 |
| Luminance | 8 | $2 * Q_p$ | $Q_p + 8$ | $2 * Q_p - 16$ |
| Chrominance | 8 | $(Q_p + 13)/2$ | $(Q_p + 13)/2$ | $Q_p - 6$ |

Rather than compute the DC scalar for each value of $Q_p$, further efficiencies may be obtained by storing the DC scalar functions for luminance and chrominance for all values of $Q_p$ in a memory table at the quantizer 140. In this event, the quantizer 140 includes a small memory of DC scales for luminance and chrominance that may be indexed by $Q_p$ as shown in Table 2 below.

TABLE 2

| $Q_p$ | DC Scalar for Luminance | DC Scalar for Chrominance |
|---|---|---|
| 1 | 8 | 8 |
| 2 | 8 | 8 |
| 3 | 8 | 8 |
| 4 | 8 | 8 |
| 5 | 10 | 9 |
| 6 | 12 | 9 |
| 7 | 14 | 10 |
| 8 | 16 | 10 |
| 9 | 17 | 11 |
| 10 | 18 | 11 |
| 11 | 19 | 12 |
| 12 | 20 | 12 |
| 13 | 21 | 13 |
| 14 | 22 | 13 |
| 15 | 23 | 14 |
| 16 | 24 | 14 |
| 17 | 25 | 15 |
| 18 | 26 | 15 |
| 19 | 27 | 16 |
| 20 | 28 | 16 |
| 21 | 29 | 17 |
| 22 | 30 | 17 |
| 23 | 31 | 18 |
| 24 | 32 | 18 |
| 25 | 34 | 19 |
| 26 | 36 | 20 |
| 27 | 38 | 21 |
| 28 | 40 | 22 |
| 29 | 42 | 23 |
| 30 | 44 | 24 |
| 31 | 46 | 25 |

In operation, the transform circuit 130 outputs macro data to the quantizer 140. Each macro block contains zero or more blocks of luminance data and zero or more blocks of chrominance data. For example, each macro block may contain as many as four blocks of luminance data and two blocks of chrominance data. A single Q.sub.p value is used for the macro block. Q.sub.p is updated an a macro block by macro block basis.

Based on the value of $Q_p$, the quantizer 140 recalls a DC scaling factor for luminance and a DC scaling factor for chrominance determined by the scaling functions at the value of $Q_p$. For each luminance block, the quantizer 140 generates a DC lum level signal according to:

*DC lum* level=*DC lum* coefficient/*DC* Scaler for Luminance.

For each chrominance block, the quantizer 140 generates a DC chrom level signal according to:

*Chrom DC* level=*Chrom DC* coefficient/*DC* Scaler for Chrominance.

The quantizer 140 outputs each DC lum level signal and each DC chrom level signal.

Figure 2:
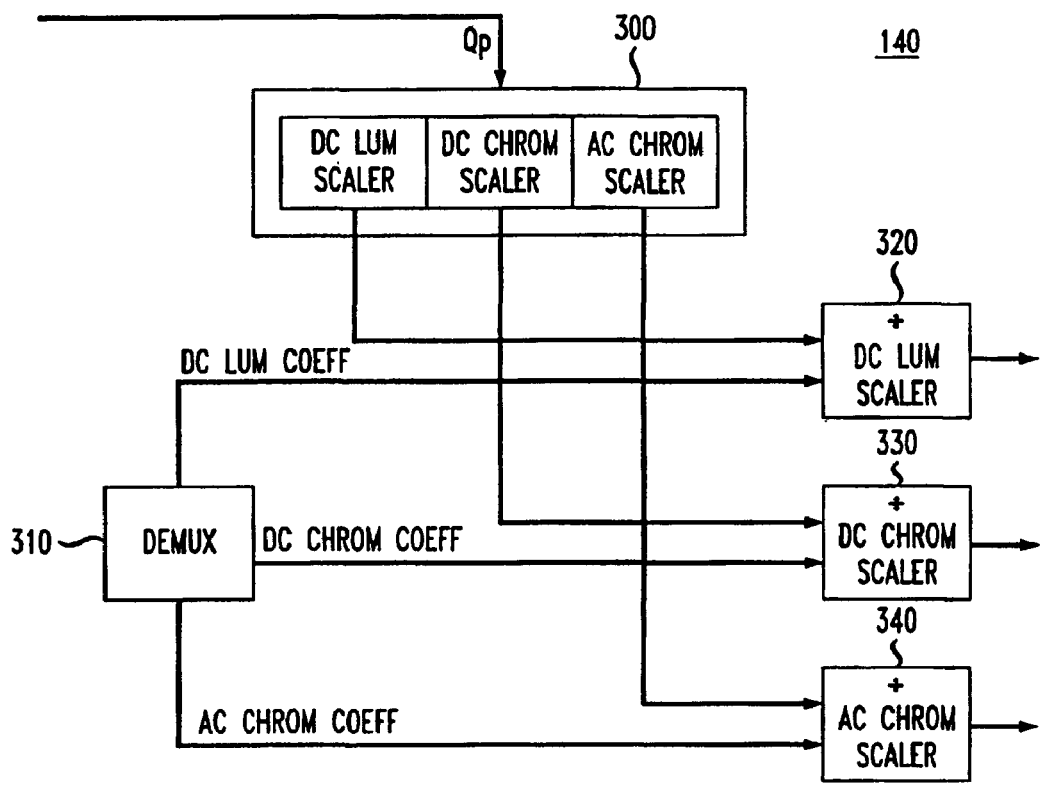
FIG. 2 is a block diagram of a portion of the quantizer of FIG. 1.

The non-linear DC scaling functions of the quantizer 140 may be implemented in hardware as shown in FIG. 2. The $Q_p$ signal is input to a memory 300 that stores the scalar factors defined by the DC luminance and DC chrominance scalar functions. The scalar table in memory 300 may be substituted by a processor (not shown) that computes the scalar factors according to the $Q_p$ value. The processor is controlled by instructions stored in a tangible computer readable medium, such as memory 300, to perform the computation. DC luminance and DC chrominance signals from the transform circuit 130 are isolated by a demultiplexer 310 and routed to respective luminance and chrominance division circuits 320 and 330. The DC lum level and DC chrom level signals are generated by these division circuits.

At the decoder 200, the dequantization circuit 240 performs an inverse quantization operation with the same piecewise linear scaling functions. Based on the $Q_p$ value of the immediately preceding macro block and any $Q_p$ update reported in the incoming bitstream, the dequantization circuit 240 recalls appropriate scaling factors for DC luminance and DC chrominance signals. For each luminance block, the dequantization circuit 240 generates a luminance DC coefficient according to:

*Lum DC* coefficient=*DC Lum* Level\**DC* Scalar for Luminance.

For each chrominance block, the scaling circuit 240 generates a DC coefficient according to:

*Chrom DC* coefficient=*Chrom DC* Level\**DC* Scalar for Chrominance.

The dequantization circuit 240 outputs the reconstructed luminance and chrominance coefficients.

Figure 3:
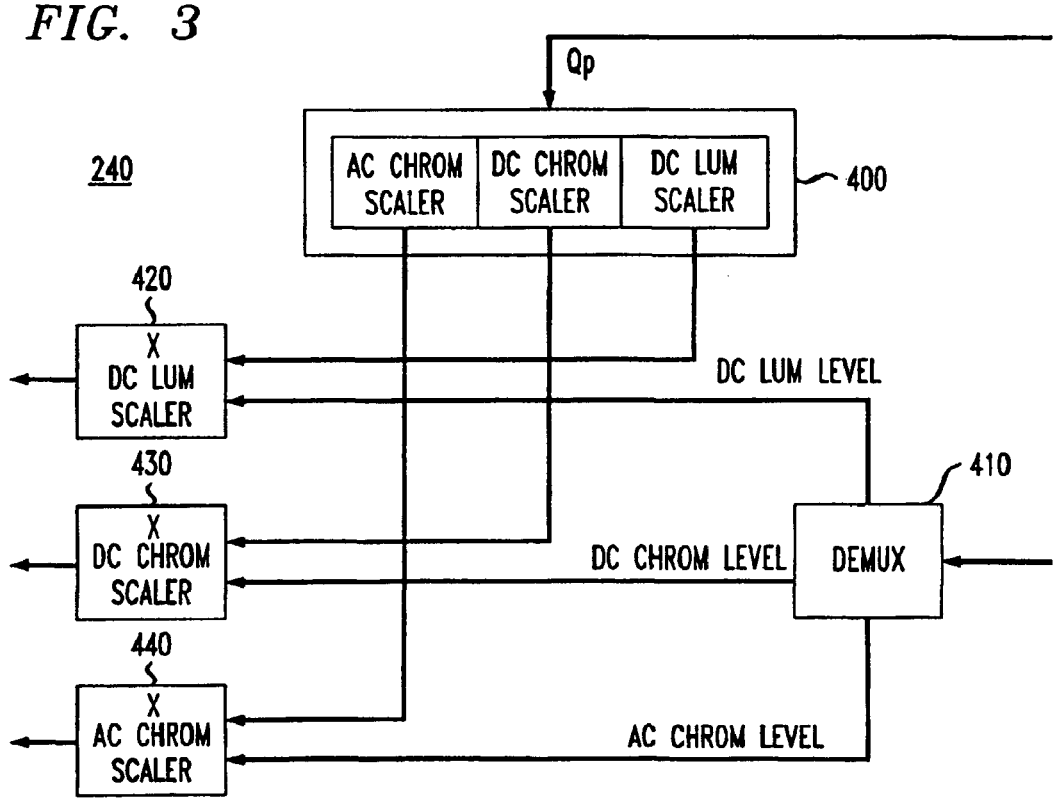
FIG. 3 is a block diagram of a portion of the scaling circuit of FIG. 1.

The non-linear DC scaling functions of the dequantization circuit 240 may be implemented in hardware as shown in FIG. 3. The $Q_p$ signal is input to a memory 400 that stores the scalar factors defined by the DC luminance and DC chrominance scalar functions. The scalar table in memory 400 may be substituted by a processor (not shown) that computes the scalar factors according to the $Q_p$ signal. DC lum level and DC chrom level signals from the variable length encoder 260 are isolated by a demultiplexer 410 and routed to respective luminance and chrominance multiplication circuits 420 and 430. DC luminance coefficients and DC chrominance coefficients are generated by these multiplication circuits.

The non-linear DC scaling factors described above are appropriate to both intra and inter coding operations. However, experience teaches that DC coefficients obtained from inter coding often are near zero. When quantized even by a constant scaling factor, the DC coefficients obtained from inter coding often are truncated to zero. Accordingly, to reduce complexity in a preferred embodiment, the non-linear scaling function may be disabled during inter coding operations. The DC coefficients obtained from inter coding may be quantized in a manner similar to the quantization of AC coefficients, discussed below.

The non-linear DC scaling functions maintain high coding quality at low $Q_p$ values and achieve significant bit rate savings at high $Q_p$ values. The quantizer 140 and dequantization circuit 240 of the present invention may find use in applications where image quality is a more significant consideration than bit rate savings. Accordingly, in a preferred embodiment, the quantizer 140 and scalar circuit 240 may have two modes of operation: A first mode applying non-linear scaling functions based on values of $Q_p$ as described above, and a second mode applying a constant scaling factor (such as divide by 8) or even one of a plurality of constant scaling factors (such as divide by 8, 4, 2 or 1). In this embodiment, the quantizer 140 generates a scalar flag signal identifying which mode of operation is being used. The dequantization circuit 240, upon receipt of the scalar flag signal, invokes an appropriate mode of operation to generate coefficients. The scalar flag signal may be a one bit signal when discriminating among the two modes, but may be larger when discriminating among the two modes and additionally identifying which of constant scaling factors is invoked.

Non-Linear Quantization of Chrominance Coefficients for Inter Coded Blocks

In inter coding, both DC and AC coefficients of chrominance blocks may be close to zero. Coding of such coefficients with non-linear scaling functions may improve coding quality of the chrominance signal. Additionally, the non-linear scaling functions of this section may be applied to AC coefficients of chrominance blocks in intra coding to achieve coding efficiencies.

The non-linear scaling function for AC chrominance coefficients is piece-wise linear and based on $Q_p$ values. At low values for $Q_p$, the non-linear scaling function for AC is a constant value, almost half of the level of the scaling function for DC chrominance signals. At high levels for $Q_p$, the AC scaling function approximates a $Q_p/2$ line. At intermediate levels, the AC scaling function approximates a $Q_p/4$ line. In one preferred embodiment, the AC scaling function for chrominance was derived experimentally as shown in Table 3 below:

TABLE 3

| | Quantizer for Chrominance when $Q_p$ in Range | | | |
|---|---|---|---|---|
| Component | 1 through 4 | 5 through 8 | 9 through 24 | 25 through 31 |
| Chrominance | 4 | $(Q_p+13)/4$ | $(Q_p+13)/4$ | $(Q_p-6)/2$ |

The AC scaling factors for chrominance also may be stored in the quantizer 140 in a memory table indexed by $Q_p$.

During coding, the quantizer 140 recalls or computes a scaling factor for AC coefficients based on the value of $Q_p$. For each chrominance AC coefficient, the quantizer 140 generates a corresponding chrominance AC level signal according to:

*Chrom AC* level=*Chrom AC* coefficient/Quantizer for Chrominance.

The quantizer 140 outputs the Chrom AC level signals for the AC coefficients.

The non-linear scaling functions for AC chrominance coefficients may be implemented in hardware, also shown in FIG.

2. The scalar table in memory 300 stores the AC chrominance scalar values indexed by $Q_p$. If scalar table in memory 300 is substituted by a processor, the processor computes the AC chrominance scalar values according to the $Q_p$ value. The processor is controlled by instructions stored in a tangible computer readable medium, such as memory 300, to perform the computation. AC chrominance signals from the transform circuit 140 are isolated by a demultiplexer 310 and routed to an AC division circuit 340. The AC chrom level signals are generated by the division circuit 340.

During decoding, the dequantization circuit 240 recalls the AC scaling factor for chrominance based on the value of $Q_p$ used for the immediately previous macro block and any $Q_p$ update provided in the incoming bitstream. For each AC chrominance level signal, the scaling circuit 240 reconstructs a corresponding AC chrominance coefficient according to:

*Chrom AC* coefficient=*Chrom AC* Level*Quantizer for Chrominance.

The scaling circuit 240 outputs the reconstructed chrominance AC coefficients.

The scaling circuit's non-linear AC scaling functions may be implemented in hardware, also shown in FIG. 3. The scalar table in memory 400 stores the AC chrominance scalar values indexed by $Q_p$. If scalar table in memory 400 is substituted by a processor, the processor computes the AC scalar value according to the $Q_p$ signal. AC chrom level signals from the variable length encoder 160 are isolated by a demultiplexer 410 and routed to an AC multiplication circuit 440. The AC coefficients are generated by the multiplication circuit 440.

Quantizer Update

The encoder 100 and decoder 200 each must use the same $Q_p$ value for video signals to be encoded and decoded intelligibly. The encoder 100 may change a value of $Q_p$ as frequently as every macro block. When the encoder 100 changes $Q_p$, it reports the change in a $Q_p$ update signal in the output bitstream.

The present invention provides for an improved method of reporting updated $Q_p$ values to the decoder 200. For each $Q_p$ update, the magnitude of the $Q_p$ adjustment depends not only on the update signal but also the previous value of $Q_p$. A given $Q_p$ update signal at a large value of $Q_p$ results in a relatively large change in $Q_p$. The same $Q_p$ update signal at a small value of $Q_p$ results in a smaller change in $Q_p$. The following Table 4 demonstrates $Q_p$ adjustments made based on the $Q_p$ update signal and the value of $Q_p$ in one preferred embodiment of the invention.

TABLE 4

| DQuant | Qp Change Based on Qp Value | | | |
|---|---|---|---|---|
| Code | 1 through 6 | 7 through 13 | 14 through 21 | 22 through 31 |
| 00 | −1 | −1 | −2 | −3 |
| 01 | −2 | −3 | −4 | −5 |
| 10 | 1 | 1 | 2 | 3 |
| 11 | 2 | 3 | 4 | 5 |

Providing variable step sizes for $Q_p$ updates based on the value of $Q_p$ provides resistance to saturation for large changes of $Q_p$ at the encoder 100. The variable step sizes provide increased flexibility without requiring additional overhead because the previous value of $Q_p$ is known at the decoder 200 and need not be reported in the bitstream.

We claim:

1. An encoder that encodes a signal into macroblocks, each macroblock comprising up to four luminance blocks and up to two chrominance blocks, and organizes the macroblocks and quantization data into a bitstream such that the macroblocks may be decoded according to a method comprising:
   determining a quantization parameter from the quantization data in the bitstream;
   generating a luminance scalar according to a first piece-wise linear transformation of the quantization parameter, wherein the first piece-wise linear transformation is selected from the group consisting of:
      the luminance scalar equals 8 whenever the quantization parameter falls within the values 1 through 4, inclusive,
      the luminance scalar equals 2 times the quantization parameter whenever the quantization parameter falls within the values 5 through 8, inclusive,
      the luminance scalar equals the quantization parameter plus 8 whenever the quantization parameter falls within the values 9 through 24, inclusive, and
      the luminance scalar equals 2 times the quantization parameter minus 16 whenever the quantization parameter falls within the values 25 through 31, inclusive;
   for each of the up to four luminance blocks that are members of the macroblock, inverse quantizing a DC coefficient of the luminance block by the luminance scalar;
   transforming data of the blocks, including the respective inverse quantized DC coefficient, according to an inverse discrete cosine transform; and
   merging via a processor data of the blocks to generate image data of the macroblock.

2. The encoder of claim 1, wherein the encoder further organizes the macroblocks and quantization data into a bitstream such that the macroblocks may be decoded according to a method that further comprises:
   generating a chrominance scalar; and
   for each of the up to two chrominance blocks that are members of the macroblock, inverse quantizing a DC coefficient of the chrominance block by the chrominance scalar.

3. The encoder of claim 1, wherein the organized bitstream comprises in at least one macroblock quantization data that represents a change in a quantization parameter associated with a previously-coded macroblock.

4. The encoder of claim 1, wherein if no quantization data is included in the bitstream for a particular macroblock, the decoder applies the quantization parameter associated with the previously-coded macroblock.

5. The encoder of claim 2, wherein the chrominance scalars are generated according to a second piece-wise linear transformation of the quantization parameter.

6. The encoder of claim 5, wherein the second piece-wise linear transformation of the quantization parameter is as provided in Table 1.

7. An encoder that encodes via a processor a signal into macroblocks, each macroblock comprising up to four luminance blocks and up to two chrominance blocks, and organizes the macroblocks and quantization data into a bitstream such that the macroblocks may be decoded according to a method comprising:
   determining a quantization parameter from the quantization data in the bitstream;
   generating a chrominance scalar according to a first piece-wise linear transformation of the quantization parameter, wherein the first piece-wise linear transformation is selected from the group consisting of:

the chrominance scalar equals 8 whenever the quantization parameter falls within the values 1 through 4, inclusive, the chrominance scalar equals (the quantization parameter+13)/2 whenever the quantization parameter falls within the values 5 through 24, inclusive, and the chrominance scalar equals the quantization parameter minus 6 whenever the quantization parameter falls within the values 25 through 31, inclusive;

for each of the up to two chrominance blocks that are members of the macroblock, inverse quantizing a DC coefficient of the chrominance block by the chrominance scalar;

transforming data of the blocks, including the respective inverse quantized DC coefficient, according to an inverse discrete cosine transform; and merging data of the blocks to generate image data of the macroblock.

8. The encoder of claim 7, wherein the encoder further organizes the macroblocks and quantization data into a bitstream such that the macroblocks may be decoded according to a method that further comprises:

generating a luminance scalar; and for each of the up to four luminance blocks that are members of the macroblock, inverse quantizing a DC coefficient of the luminance block by the luminance scalar.

9. The encoder of claim 7, wherein the organized bitstream comprises in at least one macroblock quantization data that represents a change in a quantization parameter associated with a previously-coded macroblock.

10. The encoder of claim 7, wherein if no quantization data is included in the bitstream for a particular macroblock, the decoder applies the quantization parameter associated with the previously-coded macroblock.

11. The encoder of claim 8, wherein the luminance scalars are generated according to a second piece-wise linear transformation of the quantization parameter.

12. A method of encoding a signal into macroblocks using an encoder, each macroblock comprising up to four luminance blocks and up to two chrominance blocks, the method causing the encoder to perform steps comprising:

(1) organizing the macroblocks and quantization data into a bitstream such that the macroblocks may be decoded according to a method comprising:

(a) determining a quantization parameter from the quantization data in the bitstream;

(b) generating a luminance scalar according to a first piece-wise linear transformation of the quantization parameter, wherein the first piece-wise linear transformation is selected from the group consisting of:

(i) the luminance scalar equals 8 whenever the quantization parameter falls within the values 1 through 4, inclusive, (ii) the luminance scalar equals 2 times the quantization parameter whenever the quantization parameter falls within the values 5 through 8, inclusive, (iii) the luminance scalar equals the quantization parameter plus 8 whenever the quantization parameter falls within the values 9 through 24, inclusive, and (iv) the luminance scalar equals 2 times the quantization parameter minus 16 whenever the quantization parameter falls within the values 25 through 31, inclusive;

(c) for each of the up to four luminance blocks that are members of the macroblock, inverse quantizing a DC coefficient of the luminance block by the luminance scalar;

(d) transforming data of the blocks, including the respective inverse quantized DC coefficient, according to an inverse discrete cosine transform; and (e) merging data of the blocks to generate image data of the macroblock.

13. The method of claim 12, wherein the organized bitstream is further organized into a bitstream such that the macroblocks may be decoded according to a method further comprising:

generating a chrominance scalar; and for each of up to two chrominance blocks that are members of the macroblock, inverse quantizing a DC coefficient of the chrominance block by the chrominance scalar.

14. The method of claim 12, wherein the organized bitstream comprises in at least one macroblock quantization data that represents a change in a quantization parameter from a previously-coded macroblock.

15. The method of claim 12, wherein if no quantization data is included in the bitstream for a particular macroblock, the decoder applies the quantization parameter associated with the previously-coded macroblock.

16. The method of claim 13, wherein the chrominance scalars are generated according to a second piece-wise linear transformation of the quantization parameter.

17. The method of claim 16, wherein the second piece-wise linear transformation of the quantization parameter is a provided in Table 1.

18. A method of encoding a signal into macroblocks, each macroblock comprising up to four luminance blocks and up to two chrominance blocks, the method causing a computing device to perform steps comprising:

(1) organizing the macroblocks and quantization data into a bitstream such that the macroblocks may be decoded according to a method comprising:

(a) determining a quantization parameter from the quantization data in the bitstream;

(b) generating a chrominance scalar according to a first piece-wise linear transformation of the quantization parameter, wherein the first piece-wise linear transformation is selected from the group consisting of:

(i) the chrominance scalar equals 8 whenever the quantization parameter falls within the values 1 through 4, inclusive, (ii) the chrominance scalar equals (the quantization parameter+13)/2 whenever the quantization parameter falls within the values 5 through 24, inclusive, and (iii) the chrominance scalar equals the quantization parameter minus 6 whenever the quantization parameter falls within the values 25 through 31, inclusive;

(c) for each of the up to two chrominance blocks that are members of the macroblock, inverse quantizing a DC coefficient of the chrominance block by the chrominance scalar;

(d) transforming data of the blocks, including the respective inverse quantized DC coefficient, according to an inverse discrete cosine transform; and (e) merging data of the blocks to generate image data of the macroblock.

19. The method of claim 18, wherein the organized bitstream is further organized into a bitstream such that the macroblocks may be decoded according to a method further comprising:
generating a luminance scalar; and
for each of the up to four luminance blocks that are members of the macroblock, inverse quantizing a DC coefficient of the luminance block by the luminance scalar.

20. The method of claim 18, wherein the organized bitstream comprises in at least one macroblock quantization data that represents a change in a quantization parameter from a previously-coded macroblock.

21. The method of claim 18, wherein if no quantization data is included in the bitstream for a particular macroblock, the decoder applies the quantization parameter associated with the previously-coded macroblock.

22. The method of claim 18, wherein the luminance scalars are generated according to a second piece-wise linear transformation of the quantization parameter.

23. A computer-readable storage medium storing a computer program, which when executed by a computing device causes the computing device to encode a signal into macroblocks, each macroblock comprising up to four luminance blocks and up to two chrominance blocks, and further causes the computing device to perform steps comprising:
(1) organizing the macroblocks and quantization data into a bitstream such that the macroblocks may be decoded according to the steps of:
  (a) determining a quantization parameter from the quantization data in the bitstream;
  (b) generating a luminance scalar according to a first piece-wise linear transformation of the quantization parameter, wherein the first piece-wise linear transformation is selected from the group consisting of:
    (i) the luminance scalar equals 8 whenever the quantization parameter falls within the values 1 through 4, inclusive,
    (ii) the luminance scalar equals 2 times the quantization parameter whenever the quantization parameter falls within the values 5 through 8, inclusive,
    (iii) the luminance scalar equals the quantization parameter plus 8 whenever the quantization parameter falls within the values 9 through 24, inclusive, and
    (iv) the luminance scalar equals 2 times the quantization parameter minus 16 whenever the quantization parameter falls within the values 25 through 31, inclusive;
  (c) for each of the up to four luminance blocks that are members of the macroblock, inverse quantizing a DC coefficient of the luminance block by the luminance scalar;
  (d) transforming data of the blocks, including the respective inverse quantized DC coefficient, according to an inverse discrete cosine transform; and
  (e) merging data of the blocks to generate image data of the macroblock.

24. The computer-readable storage medium of claim 23, wherein the computing device further organizes the macroblocks and quantization data into a bitstream such that the macroblocks may be decoded according to a method that further comprises:
generating a chrominance scalar; and
for each of the up to two chrominance blocks that are members of the macroblock, inverse quantizing a DC coefficient of the chrominance block by the chrominance scalar.

25. The computer-readable storage medium of claim 23, wherein the organized bitstream comprises in at least one macroblock quantization data that represents a change in a quantization parameter associated with a previously-coded macroblock.

26. The computer-readable storage medium of claim 23, wherein if no quantization data is included in the bitstream for a particular macroblock, the decoder applies the quantization parameter associated with the previously-coded macroblock.

27. The computer-readable storage medium of claim 24, wherein the chrominance scalars are generated according to a second piece-wise linear transformation of the quantization parameter.

28. The computer-readable storage medium of claim 27, wherein the second piece-wise linear transformation of the quantization parameter is as provided in Table 1.

29. A computer-readable storage medium storing instructions for controlling a computing device to encode a signal into macroblocks, each macroblock comprising up to four luminance blocks and up to two chrominance blocks, the instructions causing the computing device to perform steps comprising:
(1) organizing the macroblocks and quantization data into a bitstream such that the macroblocks may be decoded according to the steps of:
  (a) determining a quantization parameter from the quantization data in the bitstream;
  (b) generating a chrominance scalar according to a first piece-wise linear transformation of the quantization parameter, wherein the first piece-wise linear transformation is selected from the group consisting of:
    (i) the chrominance scalar equals 8 whenever the quantization parameter falls within the values 1 through 4, inclusive,
    (ii) the chrominance scalar equals (the quantization parameter+13)/2 whenever the quantization parameter falls within the values 5 through 24, inclusive, and
    (iii) the chrominance scalar equals the quantization parameter minus 6 whenever the quantization parameter falls within the values 25 through 31, inclusive;
  (c) for each of the up to two chrominance blocks that are members of the macroblock, inverse quantizing a DC coefficient of the chrominance block by the chrominance scalar;
  (d) transforming data of the blocks, including the respective inverse quantized DC coefficient, according to an inverse discrete cosine transform; and
  (e) merging data of the blocks to generate image data of the macroblock.

30. The computer-readable storage medium of claim 29, wherein the computing device further organizes the macroblocks and quantization data into a bitstream such that the macroblocks may be decoded according to a method that further comprises:
generating a luminance scalar; and
for each of the up to four luminance blocks that are members of the macroblock, inverse quantizing a DC coefficient of the luminance block by the luminance scalar.

31. The computer-readable storage medium of claim 29, wherein the organized bitstream comprises in at least one macroblock quantization data that represents a change in a quantization parameter associated with a previously-coded macroblock.

32. The computer-readable storage medium of claim 29, wherein if no differential variable is included in the bitstream for a macroblock, the encoder applies the quantization parameter associated with the previously-coded macroblock.

33. The computer-readable storage medium of claim 30, wherein the luminance scalars are generated according to a second piece-wise linear transformation of the quantization parameter.

34. A computer-implemented method of encoding a video signal, the method causing an encoder to perform steps comprising:
 (1) receiving a video signal; and
 (2) generating an encoded bitstream from the received video signal wherein the bitstream comprises macroblocks, each macroblock including up to four luminance blocks and up to two chrominance blocks, quantized DC luminance coefficients, quantized DC chrominance coefficients, and quantization data, wherein the generated bitstream is organized such that a decoder may decode the bitstream by the steps of:
  (a) extracting the quantized DC luminance coefficients and the quantized DC chrominance coefficients;
  (b) determining a quantization parameter from the quantization data;
  (c) dequantizing the quantized DC luminance coefficients according to a first inverse transformation of the quantization parameter comprising an at least three segment piece-wise linear DC luminance scaling function of the quantization parameter, wherein the at least three segment piece-wise linear DC luminance scaling function is selected from the group consisting of:
   (i) the DC luminance scaling function equals 8 when the quantization parameter falls within the values 1 and 4, inclusive,
   (ii) the DC luminance scaling function equals 2 times the quantization parameter when the quantization parameter falls within the values 5 and 8, inclusive,
   (iii) the DC luminance scaling function equals the quantization parameter plus 8 when the quantization parameter falls within the values 9 and 24, inclusive, and
   (iv) the DC luminance scaling function equals 2 times the quantization parameter minus 16 when the quantization parameter falls within the values 25 and 31, inclusive;
  (d) dequantizing the quantized DC chrominance coefficients according to a second inverse transformation of the quantization parameter comprising an at least three segment piece-wise linear DC chrominance scaling function of the quantization parameter, wherein the at least three segment piece-wise linear DC chrominance scaling function is selected from the group consisting of:
   (i) the DC chrominance scaling function equals 8 when the quantization parameter falls within the values 1 and 4, inclusive,
   (ii) the DC chrominance scaling function equals (the quantization parameter+13)/2 when the quantization parameter falls within the values 5 and 24, inclusive, and
   (iii) the DC chrominance scaling function equals the quantization parameter minus 6 when the quantization parameter falls within the values 25 and 31, inclusive;
  (e) transforming the dequantized DC luminance coefficients into blocks of luminance data;
  (f) transforming the dequantized DC chrominance coefficients into blocks of chrominance data; and
  (g) combining the luminance and chrominance blocks into an output video signal.

35. The method of claim 34, wherein the encoded bitstream further comprises quantized AC chrominance coefficients and wherein the decoder can further decode the bitstream by the steps of:
 extracting the quantized AC chrominance coefficients;
 dequantizing the quantized AC chrominance coefficients according to a third inverse transformation of the quantization parameter comprising an at least three segment piece-wise linear AC chrominance scaling function of the quantization parameter, as given by Table 3; and
 transforming the dequantized AC chrominance coefficients into blocks of chrominance data.

36. A decoder that decodes macroblocks received with quantization data in a bitstream, each macroblock comprising up to four luminance blocks and up to two chrominance blocks, the decoder comprising:
 a module configured to control the decoder to determine a quantization parameter from the quantization data in the bitstream;
 a module configured to control the decoder to generate a luminance scalar according to a first piece-wise linear transformation of the quantization parameter, wherein the first piece-wise linear transformation is selected from the group consisting of:
  the luminance scalar equals 8 whenever the quantization parameter falls within the values 1 through 4, inclusive,
  the luminance scalar equals 2 times the quantization parameter whenever the quantization parameter falls within the values 5 through 8, inclusive,
  the luminance scalar equals the quantization parameter plus 8 whenever the quantization parameter falls within the values 9 through 24, inclusive, and
  the luminance scalar equals 2 times the quantization parameter minus 16 whenever the quantization parameter falls within the values 25 through 31, inclusive;
 a module configured, for each of the luminance blocks that are members of the macroblock, to control the decoder to inverse quantize a DC coefficient of the luminance block by the luminance scalar;
 a module configured to control the decoder to transform data of the blocks, including the respective inverse quantized DC coefficients, according to an inverse discrete cosine transform; and
 a module configured to control the decoder to merge data of the blocks to generate image data of the macroblock.

37. The decoder of claim 36, wherein the decoder further comprises:
 a module configured to control the decoder to generate a chrominance scalar; and
 a module configured, for each of the chrominance blocks that are members of the macroblock, to control the decoder to inverse quantize a DC coefficient of the chrominance block by the chrominance scalar.

38. The decoder of claim 36, wherein the bitstream comprises, in at least one macroblock, quantization data that represents a change from a quantization parameter associated with a previously-decoded macroblock.

39. The decoder of claim 36, wherein, if no quantization data is included in the bitstream for a particular macroblock, the decoder applies the quantization parameter associated with a previously-decoded macroblock.

40. The decoder of claim 37, wherein the chrominance scalar is generated according to a second piece-wise linear transformation of the quantization parameter.

41. The decoder of claim 40, wherein the second piece-wise linear transformation of the quantization parameter is as provided in Table 1.

42. A decoder that decodes a signal from a bitstream that comprises macroblocks and quantization data, each macroblock comprising up to four luminance blocks and up to two chrominance blocks, the decoder comprising:
- a processor;
- a module configured to control the processor to determine a quantization parameter from the quantization data in the bitstream;
- a module configured to control the processor to generate a chrominance scalar according to a first piece-wise linear transformation of the quantization parameter, wherein the first piecewise linear transformation is selected from the group consisting of:
  - the chrominance scalar equals 8 whenever the quantization parameter falls within the values 1 through 4, inclusive,
  - the chrominance scalar equals (the quantization parameter+13)/2 whenever the quantization parameter falls within the values 5 through 24, inclusive, and
  - the chrominance scalar equals the quantization parameter minus 6 whenever the quantization parameter falls within the values 25 through 31, inclusive;
- a module configured, for each of the chrominance blocks that are members of the macroblock, to control the processor to inverse quantize a DC coefficient of the chrominance block by the chrominance scalar;
- a module configured to control the processor to transform data of the blocks, including the respective inverse quantized DC coefficients, according to an inverse discrete cosine transform; and
- a module configured to control the processor to merge data of the blocks to generate image data of the macroblock.

43. The decoder of claim 42, wherein the decoder further comprises:
- a module configured to control the processor to generate a luminance scalar; and
- a module configured, for each of the luminance blocks that are members of the macroblock, to control the processor to inverse quantize a DC coefficient of the luminance block by the luminance scalar.

44. The decoder of claim 42, wherein the organized bitstream comprises, in at least one macroblock, quantization data that represents a change from a quantization parameter associated with a previously-decoded macroblock.

45. The decoder of claim 42, wherein, if no quantization data is included in the bitstream for a particular macroblock, the decoder applies the quantization parameter associated with a previously-decoded macroblock.

46. The decoder of claim 43, wherein the luminance scalar is generated according to a second piece-wise linear transformation of the quantization parameter.

47. A computer-implemented method of decoding a signal into macroblocks, each macroblock comprising up to four luminance blocks and up to two chrominance blocks, the method causing a decoder to perform steps comprising:
- (1) receiving macroblocks and quantization data in a bitstream;
- (2) determining a quantization parameter from the quantization data in the bitstream;
- (3) generating a luminance scalar according to a first piece-wise linear transformation of the quantization parameter, wherein the first piece-wise linear transformation is selected from the group consisting of:
  - (a) the luminance scalar equals 8 whenever the quantization parameter falls within the values 1 through 4, inclusive,
  - (b) the luminance scalar equals 2 times the quantization parameter whenever the quantization parameter falls within the values 5 through 8, inclusive,
  - (c) the luminance scalar equals the quantization parameter plus 8 whenever the quantization parameter falls within the values 9 through 24, inclusive, and
  - (d) the luminance scalar equals 2 times the quantization parameter minus 16 whenever the quantization parameter falls within the values 25 through 31, inclusive;
- (4) for each of the luminance blocks that are members of the macroblock, inverse quantizing a DC coefficient of the luminance block by the luminance scalar;
- (5) transforming data of the blocks, including the respective inverse quantized DC coefficients, according to an inverse discrete cosine transform; and
- (6) merging data of the blocks to generate image data of the macroblock.

48. The method of claim 47, wherein the method fun her causes the decoder to perform steps comprising:
- generating a chrominance scalar; and
- for each of the chrominance blocks that are members of the macroblock, inverse quantizing a DC coefficient of the chrominance block by the chrominance scalar.

49. The method of claim 47, wherein the bitstream comprises, in at least one macroblock, quantization data that represents a change from a quantization parameter for a previously-decoded macroblock.

50. The method of claim 47, wherein, if no quantization data is included in the bitstream for a particular macroblock, the decoder applies the quantization parameter for a previously-decoded macroblock.

51. The method of claim 48, wherein the chrominance scalar is generated according to a second piece-wise linear transformation of the quantization parameter.

52. The method of claim 51, wherein the second piece-wise linear transformation of the quantization parameter is as provided in Table 1.

53. A method of decoding a signal into macroblocks, each macroblock comprising up to four luminance blocks and up to two chrominance blocks, the method causing a decoder to perform steps comprising:
- (1) receiving macroblocks and quantization data from a bitstream;
- (2) determining a quantization parameter from the quantization data in the bitstream;
- (3) generating a chrominance scalar according to a first piece-wise linear transformation of the quantization parameter, wherein the first piece-wise linear transformation is selected from the group consisting of:
  - (a) the chrominance scalar equals 8 whenever the quantization parameter falls within the values 1 through 4, inclusive,
  - (b) the chrominance scalar equals (the quantization parameter+13)/2 whenever the quantization parameter falls within the values 5 through 24, inclusive, and
  - (c) the chrominance scalar equals the quantization parameter minus 6 whenever the quantization parameter falls within the values 25 through 31, inclusive;
- (4) for each of the chrominance blocks that are members of the macroblock, inverse quantizing a DC coefficient of the chrominance block by the chrominance scalar;

(5) transforming data of the blocks, including the respective inverse quantized DC coefficients, according to an inverse discrete cosine transform; and (6) merging data of the blocks to generate image data of the macroblock.

54. The method of claim 53, wherein the method further causes the decoder to perform steps comprising:

generating a luminance scalar; and for each of the luminance blocks that are members of the macroblock, inverse quantizing a DC coefficient of the luminance block by the luminance scalar.

55. The method of claim 53, wherein the bitstream comprises, in at least one macroblock, quantization data that represents a change from a quantization parameter for a previously-decoded macroblock.

56. The method of claim 53, wherein, if no quantization data is included in the bitstream for a particular macroblock, the decoder applies the quantization parameter for a previously-decoded macroblock.

57. The method of claim 53, wherein the luminance scalar is generated according to a second piece-wise linear transformation of the quantization parameter.

58. An image decoder comprising:

(1) a processor;

(2) a module configured to control the processor to inverse quantize DC coefficients of luminance blocks received in a bitstream according to a piece-wise linear transform of a quantization parameter, wherein the piece-wise linear transform of a quantization parameter is calculated as follows:

(a) the piece-wise linear transform equals 8 whenever the quantization parameter falls within the values 1 through 4, inclusive, (b) the piece-wise linear transform equals 2 times the quantization parameter whenever the quantization parameter falls within the values 5 through 8, inclusive, (c) the piece-wise linear transform equals the quantization parameter plus 8 whenever the quantization parameter falls within the values 9 through 24, inclusive, and (d) the piece-wise linear transform equals 2 times the quantization parameter minus 16 whenever the quantization parameter falls within the values 25 through 31, inclusive; and (3) a module configured to control the processor to predict DC coefficient data of the blocks according to a gradient prediction analysis.

59. An image decoder comprising:

(1) a module configured to control the decoder to inverse quantize DC coefficients of chrominance blocks according to a piece-wise linear transform of the quantization parameter, the piece-wise linear transform of the quantization parameter is calculated as follows:

(a) the piece-wise linear transform equals 8 whenever the quantization parameter falls within the values 1 through 4, inclusive, (b) the piece-wise linear transform equals (the quantization parameter+13)/2 whenever the quantization parameter falls within the values 5 through 24, inclusive, and (c) the piece-wise linear transform equals the quantization parameter minus 6 whenever the quantization parameter falls within the values 25 through 31, inclusive; and (2) a module configured to control the decoder to predict DC coefficient data of the blocks according to a gradient prediction analysis.

60. A computer-readable storage medium storing instructions for decoding macroblocks comprising up to four luminance blocks and up to two chrominance blocks, the instructions, when executed by a decoder having a processor, cause the decoder to perform the steps:

(1) receiving the macroblocks and quantization data in a bitstream;

(2) determining a quantization parameter from the quantization data in the bitstream;

(3) generating a luminance scalar according to a first piece-wise linear transformation of the quantization parameter, wherein the first piece-wise linear transformation is selected from the group consisting of:

(a) the luminance scalar equals 8 whenever the quantization parameter falls within the values 1 through 4, inclusive, (b) the luminance scalar equals 2 times the quantization parameter whenever the quantization parameter falls within the values 5 through 8, inclusive, (c) the luminance scalar equals the quantization parameter plus 8 whenever the quantization parameter falls within the values 9 through 24, inclusive, and (d) the luminance scalar equals 2 times the quantization parameter minus 16 whenever the quantization parameter falls within the values 25 through 31, inclusive;

(4) for each of the luminance blocks that are members of the macroblock, inverse quantizing a DC coefficient of the luminance block by the luminance scalar;

(5) transforming data of the blocks, including the respective inverse quantized DC coefficients, according to an inverse discrete cosine transform; and (6) merging data of the blocks to generate image data of the macroblock.

61. The computer-readable storage medium of claim 60, wherein the instructions further comprise:

generating a chrominance scalar; and for each of the chrominance blocks that are members of the macroblock, inverse quantizing a DC coefficient of the chrominance block by the chrominance scalar.

62. The computer-readable storage medium of claim 60, wherein the bitstream comprises, in at least one macroblock, quantization data that represents a change in a quantization parameter associated with a previously-decoded macroblock.

63. The computer-readable storage medium of claim 60, wherein, if no quantization data is included in the bitstream for a particular macroblock, the decoder applies the quantization parameter associated with a previously-decoded macroblock.

64. The computer-readable storage medium of claim 61, wherein the chrominance scalar is generated according to a second piece-wise linear transformation of the quantization parameter.

65. The computer-readable storage medium of claim 64, wherein the second piece-wise linear transformation of the quantization parameter is.

66. A computer-readable storage medium storing instructions which, when executed by a processor, decode macroblocks comprising up to four luminance blocks and up to two chrominance blocks, the instructions causing the processor to perform steps comprising:

(1) receiving the macroblocks and quantization data in a bitstream;

(2) determining a quantization parameter from the quantization data in the bitstream;

(3) generating a chrominance scalar according to a first piece-wise linear transformation of the quantization parameter, wherein the first piece wise linear transformation is selected from the group consisting of:
  (i) the chrominance scalar equals 8 whenever the quantization parameter falls within the values 1 through 4, inclusive,
  (ii) the chrominance scalar equals (the quantization parameter+13)/2 whenever the quantization parameter falls within the values 5 through 24, inclusive, and
  (iii) the chrominance scalar equals the quantization parameter minus 6 whenever the quantization parameter falls within the values 25 through 31, inclusive;

(4) for each of the chrominance blocks that are members of the macroblock, inverse quantizing a DC coefficient of the chrominance block by the chrominance scalar;

(5) transforming data of the blocks, including the respective inverse quantized DC coefficients, according to an inverse discrete cosine transform; and (6) merging data of the blocks to generate image data of the macroblock.

67. The computer-readable storage medium of claim 66, wherein the instructions further cause the processor to perform steps comprising:
  generating a luminance scalar; and
  for each of the up to four luminance blocks that are members of the macroblock, inverse quantizing a DC coefficient of the luminance block by the luminance scalar.

68. The computer-readable storage medium of claim 66, wherein the bitstream comprises, in at least one macroblock, quantization data that represents a change from a quantization parameter associated with a previously-decoded macroblock.

69. The computer-readable storage medium of claim 66, wherein, if no quantization data is included in the bitstream for a macroblock, the decoder applies the quantization parameter associated with a previously-decoded macroblock.

70. The computer-readable storage medium of claim 67, wherein the luminance scalar is generated according to a second piece-wise linear transformation of the quantization parameter.

71. A decoder for decoding video signals according to an at least three-segment piece-wise linear luminance scaling function based on a quantization parameter, the decoder comprising:
  a processor;
  a module configured to control the processor to generate a luminance scaling function as follows:
    the luminance scaling function equals 8 when the quantization parameter falls within the values 1 and 4, inclusive;
    the luminance scaling function equals 2 times the quantization parameter when the quantization parameter falls within the values 5 and 8, inclusive;
    the luminance scaling function equals the quantization parameter plus 8 when the quantization parameter falls within the values 9 and 24, inclusive; and
    the luminance scaling function equals 2 times the quantization parameter minus 16 when the quantization parameter falls within the values 25 and 31, inclusive.

72. A decoder for decoding video signals according to an at least three-segment piece-wise linear DC chrominance scaling function based on a quantization parameter, the decoder comprising:
  a processor;
  a module configured to control the processor to generate a DC chrominance scaling function as follows:
    the DC chrominance scaling function equals 8 when the quantization parameter falls within the values 1 and 4, inclusive;
    the DC chrominance scaling function equals (quantization parameter+13)/2 when the quantization parameter falls within the values 5 and 24, inclusive; and
    the DC chrominance scaling function equals the quantization parameter minus 6 when the quantization parameter falls within the values 25 and 31, inclusive.

73. A decoder for decoding video signals according to an at least three-segment piece-wise linear AC chrominance scaling function based on quantization data, the decoder comprising:
  a module configured to control the decoder to generate an AC chrominance scaling function, based on a quantization parameter identified from the quantization data, as follows:
    the AC chrominance scaling function equals 4 when the quantization parameter falls within the values 1 and 4, inclusive;
    the AC chrominance scaling function equals (the quantization parameter+13)/4 when the quantization parameter falls within the values 5 and 24, inclusive; and
    the AC chrominance scaling function equals (the quantization parameter−6)/2 when the quantization parameter falls within the values 25 and 31, inclusive.

74. A method of decoding a bitstream using a decoder, the method causing the decoder to perform steps comprising:
  (1) extracting quantized DC luminance coefficients and quantized DC chrominance coefficients from a bitstream comprising macroblocks, each macroblock including up to four luminance blocks and up to two chrominance blocks, quantized DC luminance coefficients, quantized DC chrominance coefficients, and quantization data;
  (2) determining a quantization parameter from the quantization data;
  (3) dequantizing the quantized DC luminance coefficients according to a first transformation of the quantization parameter comprising an at least three segment piece-wise linear DC luminance scaling function of the quantization parameter, wherein the first transformation is selected from the group consisting of:
    (a) the DC luminance scaling function equals 8 when the quantization parameter falls within the values 1 and 4, inclusive,
    (b) the DC luminance scaling function equals 2 times the quantization parameter when the quantization parameter falls within the values 5 and 8, inclusive,
    (c) the DC luminance scaling function equals the quantization parameter plus 8 when the quantization parameter falls within the values 9 and 24, inclusive, and
    (d) the DC luminance scaling function equals 2 times the quantization parameter minus 16 when the quantization parameter falls within the values 25 and 31, inclusive;
  (4) dequantizing the quantized DC chrominance coefficients according to a second transformation of the quantization parameter comprising an at least three segment piece-wise linear DC chrominance scaling function of the quantization parameter, wherein the second transformation is selected from the group consisting of (a) the DC chrominance scaling function equals 8 whenever the quantization parameter falls within the values 1 through 4, inclusive,
(b) the DC chrominance scaling function equals (the quantization parameter+13)/2 whenever the quantization parameter falls within the values 5 through 24, inclusive, and
(c) the DC chrominance scaling function equals the quantization parameter minus 6 whenever the quantization parameter falls within the values 25 through 31, inclusive;
(5) transforming the dequantized DC luminance coefficients into blocks of luminance data;
(6) transforming the dequantized DC chrominance coefficients into blocks of chrominance data; and
(7) combining the luminance and chrominance blocks into an output video signal.

75. The method of claim 74, wherein the bitstream further comprises quantized AC chrominance coefficients and wherein the method further causes the computing device to perform steps comprising:

extracting the quantized AC chrominance coefficients;
dequantizing the quantized AC chrominance coefficients according to a third transformation of the quantization parameter comprising an at least three segment piecewise linear AC chrominance scaling function of the quantization parameter, as given by Table 3; and
transforming the dequantized AC chrominance coefficients into blocks of chrominance data.

76. The method of claim 74, wherein the method further causes the decoder to perform steps comprising:

extracting from the bitstream a fixed length code representing a change in the quantization parameter with reference to a previous value of the quantization parameter, wherein the code corresponds to an index for a table of permissible quantization parameter changes.

77. The method of claim 76, wherein the table of permissible quantization parameter changes comprises the values −2, −1, 1, and 2.

* * * * *